United States Patent
Doh et al.

(10) Patent No.: US 11,550,661 B2
(45) Date of Patent: Jan. 10, 2023

(54) ERROR CORRECTION OF MEMORY

(71) Applicant: SK hynix Inc., Gyeonggi-do (KR)

(72) Inventors: Eun Hyup Doh, Gyeonggi-do (KR); Man Keun Kang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/326,889

(22) Filed: May 21, 2021

(65) Prior Publication Data

US 2022/0229726 A1 Jul. 21, 2022

(30) Foreign Application Priority Data

Jan. 14, 2021 (KR) .......................... 10-2021-0005143

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0659* (2013.01); *G06F 3/0673* (2013.01)

(58) Field of Classification Search
CPC .. G06F 11/1076; G06F 3/0619; G06F 3/0659; G06F 3/0673
See application file for complete search history.

(56) References Cited

U.S. PATENT DOCUMENTS

| | | | |
|---|---|---|---|
| 9,947,412 B1* | 4/2018 | Hu ...................... | G11C 11/5642 |
| 2006/0080515 A1* | 4/2006 | Spiers ................. | G06F 11/1456 |
| | | | 714/14 |

FOREIGN PATENT DOCUMENTS

KR 10-0927397 11/2009

* cited by examiner

*Primary Examiner* — Kyle Vallecillo
(74) *Attorney, Agent, or Firm* — IP & T Group LLP

(57) ABSTRACT

A memory includes: a data receiving circuit suitable for receiving a data during a write operation; a data rotation circuit suitable for changing an order of the data transferred from the data receiving circuit and outputting the data whose order is changed in response to an address during the write operation; an error correction code generation circuit suitable for generating an error correction code based on the data output from the data rotation circuit during the write operation; and a memory core suitable for storing the data received by the data receiving circuit and the error correction code during the write operation.

7 Claims, 14 Drawing Sheets

FIG. 2

| DATA | | | | | | | | ECC | | | |
|---|---|---|---|---|---|---|---|---|---|---|---|
| D0 | D1 | D2 | D3 | D4 | D5 | D6 | D7 | E0 | E1 | E2 | E3 |
| 1 | 1 | 1 | 0 | 1 | 1 | 1 | 1 | 1 | 0 | 0 | 0 |
| 1 | 1 | 0 | 1 | 1 | 0 | 0 | 1 | 0 | 1 | 0 | 0 |
| 1 | 0 | 1 | 1 | 0 | 1 | 0 | 1 | 0 | 0 | 1 | 0 |
| 0 | 1 | 1 | 1 | 0 | 0 | 1 | 1 | 0 | 0 | 0 | 1 |

FIG. 3

| DATA | | | | | | | | ECC | | | |
|---|---|---|---|---|---|---|---|---|---|---|---|
| D0 | D1 | D2 | D3 | D4 | D5 | D6 | D7 | E0 | E1 | E2 | E3 |
| 1*D0 | 1*D1 | 1*D2 | 0*D3 | 1*D4 | 1*D5 | 1*D6 | 1*D7 | 1*E0 | 0*E1 | 0*E2 | 0*E3 |
| 1*D0 | 1*D1 | 0*D2 | 1*D3 | 1*D4 | 0*D5 | 0*D6 | 1*D7 | 0*E0 | 1*E1 | 0*E2 | 0*E3 |
| 1*D0 | 0*D1 | 1*D2 | 1*D3 | 0*D4 | 1*D5 | 0*D6 | 1*D7 | 0*E0 | 0*E1 | 1*E2 | 0*E3 |
| 0*D0 | 1*D1 | 1*D2 | 1*D3 | 0*D4 | 0*D5 | 1*D6 | 1*D7 | 0*E0 | 0*E1 | 0*E2 | 1*E3 |

| DATA | | | | | | | | ECC | | | |
|---|---|---|---|---|---|---|---|---|---|---|---|
| 1 | 1 | 0 | 0 | 1 | 0 | 1 | 0 | 0 | 1 | 1 | 0 |
| 1*1 | 1*1 | 1*0 | 0*0 | 1*1 | 1*0 | 1*1 | 1*0 | 1*0 | 0*1 | 0*1 | 0*0 |
| 1*1 | 1*1 | 0*0 | 1*0 | 1*1 | 0*0 | 0*1 | 1*0 | 0*0 | 1*1 | 0*1 | 0*0 |
| 1*1 | 0*1 | 1*0 | 1*0 | 0*1 | 1*0 | 0*1 | 1*0 | 0*0 | 0*1 | 1*1 | 0*0 |
| 0*1 | 1*1 | 1*0 | 1*0 | 0*1 | 0*0 | 1*1 | 1*0 | 0*0 | 0*1 | 0*1 | 1*0 |

| DATA' | | | | | | | | ECC | | | |
|---|---|---|---|---|---|---|---|---|---|---|---|
| 1 | 1 | 0 | 0 | 1 | 0 | 0 | 0 | 0 | 1 | 1 | 0 |
| 1*1 | 1*1 | 1*0 | 0*0 | 1*1 | 1*0 | 1*0 | 1*0 | 1*0 | 0*1 | 0*0 | 0*0 |
| 1*1 | 1*1 | 0*0 | 1*0 | 1*1 | 0*0 | 0*0 | 1*0 | 0*0 | 1*1 | 0*0 | 0*0 |
| 1*1 | 0*1 | 1*0 | 1*0 | 0*1 | 1*0 | 0*0 | 1*0 | 0*0 | 0*1 | 1*1 | 0*0 |
| 0*1 | 1*1 | 1*0 | 1*0 | 0*1 | 0*0 | 1*0 | 1*0 | 0*0 | 0*1 | 0*0 | 1*0 |

| DATA' | | | | | | | | ECC | | | |
|---|---|---|---|---|---|---|---|---|---|---|---|
| 0 | 1 | 0 | 1 | 1 | 0 | 1 | 0 | 0 | 1 | 1 | 0 |
| 1*0 | 1*1 | 1*0 | 0*1 | 1*1 | 1*0 | 1*1 | 1*0 | 1*0 | 0*1 | 0*0 | 0*0 |
| 1*0 | 1*1 | 0*0 | 1*1 | 1*1 | 0*0 | 0*1 | 1*0 | 0*0 | 1*1 | 0*0 | 0*0 |
| 1*0 | 0*1 | 1*0 | 1*1 | 0*1 | 1*0 | 0*1 | 1*0 | 0*0 | 0*1 | 1*1 | 0*0 |
| 0*0 | 1*1 | 1*0 | 1*1 | 0*1 | 0*0 | 1*1 | 1*0 | 0*0 | 0*1 | 0*0 | 1*0 |

| DATA' | | | | | | | | ECC | | | |
|---|---|---|---|---|---|---|---|---|---|---|---|
| 1 | 1 | 0 | 0 | 1 | 0 | 0 | 1 | 0 | 1 | 1 | 0 |
| 1*1 | 1*1 | 1*0 | 0*0 | 1*1 | 1*0 | 1*0 | 1*1 | 1*0 | 0*1 | 0*1 | 0*0 |
| 1*1 | 1*1 | 0*0 | 1*0 | 1*1 | 0*0 | 0*0 | 1*1 | 0*0 | 1*1 | 0*1 | 0*0 |
| 1*1 | 0*1 | 1*0 | 1*0 | 0*1 | 1*0 | 0*0 | 1*1 | 0*0 | 0*1 | 1*1 | 0*0 |
| 0*1 | 1*1 | 1*0 | 1*0 | 0*1 | 0*0 | 1*0 | 1*1 | 0*0 | 0*1 | 0*1 | 1*0 |

| DATA | | | | | | | | | | | | | | | | | | | | | | | | | | | | | | | | ECC | | | | | |
|---|---|---|---|---|---|---|---|---|---|---|---|---|---|---|---|---|---|---|---|---|---|---|---|---|---|---|---|---|---|---|---|---|---|---|---|---|---|
| D0 | D1 | D2 | D3 | D4 | D5 | D6 | D7 | D8 | D9 | D10 | D11 | D12 | D13 | D14 | D15 | D16 | D17 | D18 | D19 | D20 | D21 | D22 | D23 | D24 | D25 | D26 | D27 | D28 | D29 | D30 | D31 | E0 | E1 | E2 | E3 | E4 | E5 |
| 1 | 0 | 0 | 1 | 1 | 1 | 1 | 0 | 0 | 1 | 1 | 1 | 0 | 0 | 1 | 0 | 0 | 1 | 1 | 1 | 0 | 0 | 1 | 0 | 0 | 1 | 1 | 1 | 0 | 0 | 1 | 1 | 1 | 0 | 0 | 0 | 0 | 0 |
| 0 | 1 | 1 | 1 | 1 | 0 | 0 | 1 | 1 | 1 | 1 | 0 | 0 | 0 | 0 | 1 | 1 | 0 | 1 | 0 | 0 | 0 | 0 | 1 | 1 | 1 | 1 | 0 | 0 | 1 | 0 | 0 | 0 | 1 | 0 | 0 | 0 | 0 |
| 1 | 1 | 1 | 0 | 1 | 0 | 0 | 0 | 0 | 0 | 0 | 0 | 1 | 0 | 1 | 0 | 0 | 1 | 0 | 0 | 1 | 1 | 1 | 1 | 1 | 1 | 1 | 1 | 1 | 1 | 1 | 1 | 0 | 0 | 1 | 0 | 0 | 0 |
| 0 | 0 | 0 | 1 | 0 | 0 | 0 | 0 | 0 | 0 | 0 | 0 | 0 | 1 | 0 | 1 | 1 | 0 | 1 | 1 | 1 | 1 | 1 | 1 | 1 | 1 | 0 | 0 | 1 | 0 | 1 | 0 | 0 | 0 | 0 | 1 | 0 | 0 |
| 0 | 0 | 0 | 0 | 0 | 0 | 1 | 0 | 1 | 0 | 1 | 0 | 1 | 0 | 1 | 0 | 1 | 0 | 0 | 0 | 0 | 0 | 1 | 0 | 1 | 0 | 1 | 0 | 1 | 0 | 1 | 0 | 0 | 0 | 0 | 0 | 1 | 0 |
| 0 | 0 | 0 | 0 | 0 | 0 | 0 | 1 | 0 | 1 | 0 | 1 | 0 | 1 | 0 | 1 | 0 | 1 | 0 | 1 | 1 | 1 | 0 | 1 | 0 | 1 | 0 | 1 | 0 | 1 | 0 | 1 | 0 | 0 | 0 | 0 | 0 | 1 |

FIG. 11

| | DATA | | | | | | | | | | | | | | | | | | | | | | | | | | | | | | | | ECC | | | | | |
|---|---|---|---|---|---|---|---|---|---|---|---|---|---|---|---|---|---|---|---|---|---|---|---|---|---|---|---|---|---|---|---|---|---|---|---|---|---|---|
| | D31 | D0 | D1 | D2 | D3 | D4 | D5 | D6 | D7 | D8 | D9 | D10 | D11 | D12 | D13 | D14 | D15 | D16 | D17 | D18 | D19 | D20 | D21 | D22 | D23 | D24 | D25 | D26 | D27 | D28 | D29 | D30 | E0 | E1 | E2 | E3 | E4 | E5 |
| | 1 | 0 | 0 | 1 | 1 | 1 | 1 | 0 | 0 | 1 | 1 | 1 | 0 | 0 | 1 | 0 | 0 | 1 | 1 | 1 | 0 | 0 | 1 | 0 | 0 | 1 | 1 | 1 | 0 | 0 | 1 | 1 | 1 | 0 | 0 | 0 | 0 | 0 |
| | 0 | 1 | 1 | 1 | 1 | 0 | 0 | 1 | 1 | 1 | 1 | 0 | 0 | 0 | 0 | 1 | 1 | 0 | 1 | 0 | 0 | 0 | 0 | 1 | 1 | 1 | 1 | 0 | 0 | 0 | 0 | 0 | 0 | 1 | 0 | 0 | 0 | 0 |
| | 1 | 0 | 1 | 0 | 1 | 0 | 0 | 0 | 0 | 0 | 0 | 0 | 1 | 0 | 1 | 0 | 1 | 0 | 0 | 0 | 0 | 1 | 1 | 1 | 1 | 1 | 0 | 1 | 1 | 1 | 1 | 1 | 0 | 0 | 1 | 0 | 0 | 0 |
| | 0 | 1 | 0 | 1 | 0 | 1 | 0 | 0 | 0 | 0 | 0 | 0 | 0 | 1 | 0 | 1 | 1 | 1 | 0 | 1 | 1 | 1 | 1 | 1 | 1 | 1 | 1 | 0 | 1 | 1 | 1 | 0 | 0 | 0 | 0 | 1 | 0 | 0 |
| | 0 | 0 | 0 | 0 | 0 | 0 | 1 | 0 | 1 | 0 | 1 | 0 | 1 | 0 | 1 | 1 | 1 | 0 | 1 | 0 | 1 | 0 | 0 | 0 | 1 | 0 | 1 | 0 | 1 | 0 | 1 | 0 | 0 | 0 | 0 | 0 | 1 | 0 |
| | 0 | 0 | 0 | 0 | 0 | 0 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 1 | 1 | 0 | 0 | 0 | 0 | 0 | 1 |

FIG. 12

| | DATA | | | | | | | | | | | | | | | | | | | | | | | | | | | | | | | | ECC | | | | | |
|---|---|---|---|---|---|---|---|---|---|---|---|---|---|---|---|---|---|---|---|---|---|---|---|---|---|---|---|---|---|---|---|---|---|---|---|---|---|---|
| D0 | D1 | D2 | D3 | D4 | D5 | D6 | D7 | D8 | D9 | D10 | D11 | D12 | D13 | D14 | D15 | D16 | D17 | D18 | D19 | D20 | D21 | D22 | D23 | D24 | D25 | D26 | D27 | D28 | D29 | D30 | D31 | E0 | E1 | E2 | E3 | E4 | E5 |
| 0 | 0 | 1 | 1 | 1 | 1 | 0 | 0 | 1 | 1 | 1 | 0 | 0 | 1 | 0 | 0 | 1 | 1 | 1 | 0 | 0 | 1 | 0 | 0 | 1 | 1 | 1 | 0 | 0 | 1 | 1 | 1 | 1 | 0 | 0 | 0 | 0 | 0 |
| 1 | 1 | 1 | 1 | 0 | 0 | 1 | 0 | 1 | 1 | 0 | 0 | 0 | 0 | 1 | 1 | 0 | 1 | 0 | 0 | 0 | 0 | 1 | 1 | 1 | 1 | 0 | 0 | 0 | 0 | 0 | 0 | 0 | 1 | 0 | 0 | 0 | 0 |
| 0 | 1 | 0 | 1 | 0 | 0 | 0 | 0 | 0 | 0 | 0 | 1 | 0 | 1 | 0 | 0 | 0 | 1 | 0 | 0 | 1 | 0 | 1 | 0 | 1 | 0 | 1 | 1 | 1 | 1 | 1 | 1 | 0 | 0 | 1 | 0 | 0 | 0 |
| 1 | 0 | 1 | 0 | 1 | 0 | 1 | 0 | 0 | 0 | 0 | 0 | 1 | 0 | 1 | 1 | 1 | 1 | 1 | 1 | 0 | 1 | 0 | 1 | 0 | 1 | 1 | 1 | 0 | 1 | 0 | 0 | 0 | 0 | 0 | 1 | 0 | 0 |
| 0 | 0 | 0 | 0 | 0 | 1 | 1 | 0 | 0 | 1 | 0 | 1 | 0 | 1 | 0 | 1 | 0 | 1 | 0 | 1 | 1 | 1 | 0 | 1 | 0 | 1 | 0 | 1 | 0 | 1 | 1 | 0 | 0 | 0 | 0 | 0 | 1 | 0 |
| 0 | 0 | 0 | 0 | 0 | 0 | 0 | 1 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 0 | 0 | 0 | 1 |

FIG. 13

| | D0, D1 Corrected | D2, D3 Corrected | D4, D5 Corrected | D6, D7 Corrected | D8, D9 Corrected | D10, D11 Corrected | D12, D13 Corrected | D14, D15 Corrected | D16, D17 Corrected | D18, D19 Corrected | D20, D21 Corrected | D22, D23 Corrected | D24, D25 Corrected | D26, D27 Corrected | D28, D29 Corrected | D30, D31 Corrected |
|---|---|---|---|---|---|---|---|---|---|---|---|---|---|---|---|---|
| Calculation Result of Checker | 1 | 1 | 0 | 1 | 1 | 0 | 0 | 1 | 1 | 0 | 0 | 1 | 1 | 0 | 0 | 1 |
| | 1 | 0 | 1 | 1 | 0 | 1 | 0 | 1 | 0 | 1 | 1 | 1 | 0 | 1 | 0 | 1 |
| | 1 | 1 | 1 | 0 | 0 | 0 | 1 | 1 | 1 | 1 | 1 | 0 | 1 | 0 | 1 | 0 |
| | 0 | 0 | 0 | -1 | -1 | -1 | -1 | -1 | -1 | -1 | -1 | -1 | -1 | -1 | -1 | -1 |
| | 0 | 0 | 0 | -1 | -1 | -1 | -1 | -1 | -1 | -1 | -1 | -1 | -1 | -1 | -1 | -1 |

FIG. 14

| | D1, D2 Corrected | D3, D4 Corrected | D5, D6 Corrected | D7, D8 Corrected | D9, D10 Corrected | D11, D12 Corrected | D13, D14 Corrected | D15, D16 Corrected | D17, D18 Corrected | D19, D20 Corrected | D21, D22 Corrected | D23, D24 Corrected | D25, D26 Corrected | D27, D28 Corrected | D29, D30 Corrected |
|---|---|---|---|---|---|---|---|---|---|---|---|---|---|---|---|
| Calculation Result of Checker | 1 | 0 | 1 | 1 | 0 | 0 | 1 | 1 | 0 | 0 | 1 | 1 | 0 | 0 | 1 |
| | 0 | 1 | 1 | 0 | 1 | 0 | 1 | 0 | 1 | 0 | 1 | 0 | 1 | 0 | 1 |
| | 1 | 1 | 0 | 0 | 0 | 1 | 1 | 1 | 1 | 1 | 0 | 0 | 0 | 0 | 0 |
| | 1 | 0 | 1 | 1 | 1 | 1 | 1 | 1 | 1 | 1 | 0 | 1 | 1 | 1 | 1 |
| | 0 | 0 | 1 | 1 | 1 | 1 | 1 | 1 | 1 | 1 | 1 | 1 | 1 | 1 | 1 |

ERROR CORRECTION OF MEMORY

CROSS-REFERENCE TO RELATED APPLICATIONS

The present application claims priority of Korean Patent Application No. 10-2021-0005143, filed on Jan. 14, 2021, which is incorporated herein by reference in its entirety.

BACKGROUND

1. Field

Various embodiments of the present invention relate to a memory, and more particularly, to error correction of a memory.

2. Description of the Related Art

In the early stage of a semiconductor memory device industry, there were many originally good dies on the wafers, which means that memories were produced with no defective memory cells through a semiconductor fabrication process. However, as the capacity of memories increases, it becomes difficult to fabricate a memory that does not have any defective memory cell, and nowadays, it may be said that there are substantially no chances that a memory is fabricated without any defective memory cells. To address this issue, a repair method of replacing defective memory cells with redundant memory cells in a memory is being used.

Another method of the related art is using an error correction circuit (ECC circuit) for correcting errors in a memory in order to correct errors occurring in memory cells.

SUMMARY

Embodiments of the present invention are directed to a method for reducing errors of error correction in a memory.

In accordance with an embodiment of the present invention, a memory includes: a data receiving circuit suitable for receiving data during a write operation; a data rotation circuit suitable for changing an order of the data transferred from the data receiving circuit and outputting the data having an order changed in response to an address during the write operation; an error correction code generation circuit suitable for generating an error correction code based on the data output from the data rotation circuit during the write operation; and a memory core suitable for storing a) the data received by the data receiving circuit and b) the error correction code based on the data output from the data rotation circuit during the write operation.

In accordance with another embodiment of the present invention, a memory includes: a memory core; and an ECC block suitable for generating an error correction code to be written to the memory core based on a data to be written to the memory core during a write operation, and during a read operation, correcting an error of the data read from the memory core based on the error correction code read from the memory core, wherein a check matrix used by the ECC block for generating the error correction code and for correcting the error of the read data read from the memory core, wherein the error is changed according to an address in the memory core storing the error correction code.

In accordance with still another embodiment of the present invention, a memory includes: a data receiving circuit suitable for receiving write data including a plurality of bits for a write operation; a data rotation circuit suitable for selectively changing the order of the plurality of bits in the write data based on an address associated with the write data to generate write output data; an error correction code generation circuit suitable for generating an error correction code based on the write output data; and a memory core suitable for storing the write output data and the error correction code.

BRIEF DESCRIPTION OF THE DRAWINGS

FIG. 2 shows an example of a check matrix used by the error correction code generation circuit and the error correction circuit 120.

FIG. 3 shows how the error correction code generation circuit uses a check matrix.

FIG. 4 shows a result of the error correction code generation circuit generating an error correction code ECC for data DATA by using the check matrix of FIG. 2.

FIG. 5 shows a process of the error correction circuit correcting an error based on the error correction code ECC.

FIG. 6 shows another process of the error correction circuit correcting an error based on the error correction code ECC.

FIG. 7 shows yet another process of the error correction circuit correcting an error based on the error correction code ECC.

FIGS. 10 to 12 illustrate check matrices.

FIGS. 13 and 14 show conditions for 2-bit error correction of a corrector.

DETAILED DESCRIPTION

Figure 1:
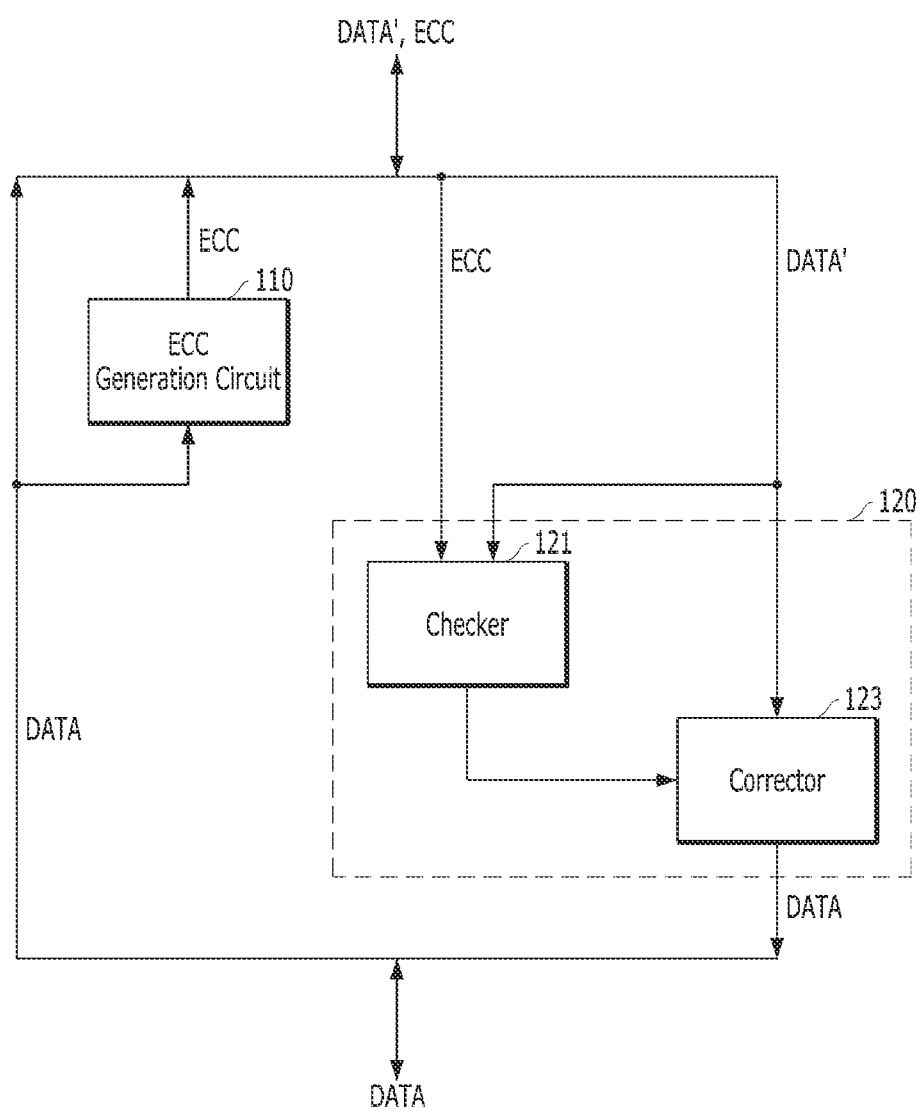
FIG. 1 is a block diagram illustrating an error correction code generation circuit and an error correction circuit in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. It is noted that reference to "an embodiment," "another embodiment" or the like does not necessarily mean only one embodiment, and different references to any such phrase are not necessarily to the same embodiment(s). The term "embodiments" when used herein does not necessarily refer to all embodiments. As used herein, singular forms may include the plural forms as well and vice versa, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

FIG. 1 is a block diagram illustrating an error correction code (ECC) generation circuit 110 and an error correction circuit 120 in accordance with an embodiment of the present invention.

The error correction code generation circuit 110 may generate an error correction code ECC based on data DATA transferred from the outside of a memory (transferred for example from a memory controller which may provide the DATA shown input at the bottom of FIG. 1) during a write operation. In other words, the error correction code generation circuit 110 may generate an error correction code ECC for correcting an error of the data DATA by encoding the data DATA. The data DATA to be encoded in the process of generating the error correction code ECC may also be referred to as a message. Since only the error correction code ECC may be generated and an error correction operation is not performed during a write operation, the data DATA may bypass the error correction code generation circuit 110. Therefore, the data DATA and the data DATA' (shown for example input at the top of FIG. 1) may be the same during a write operation.

Figure 8:
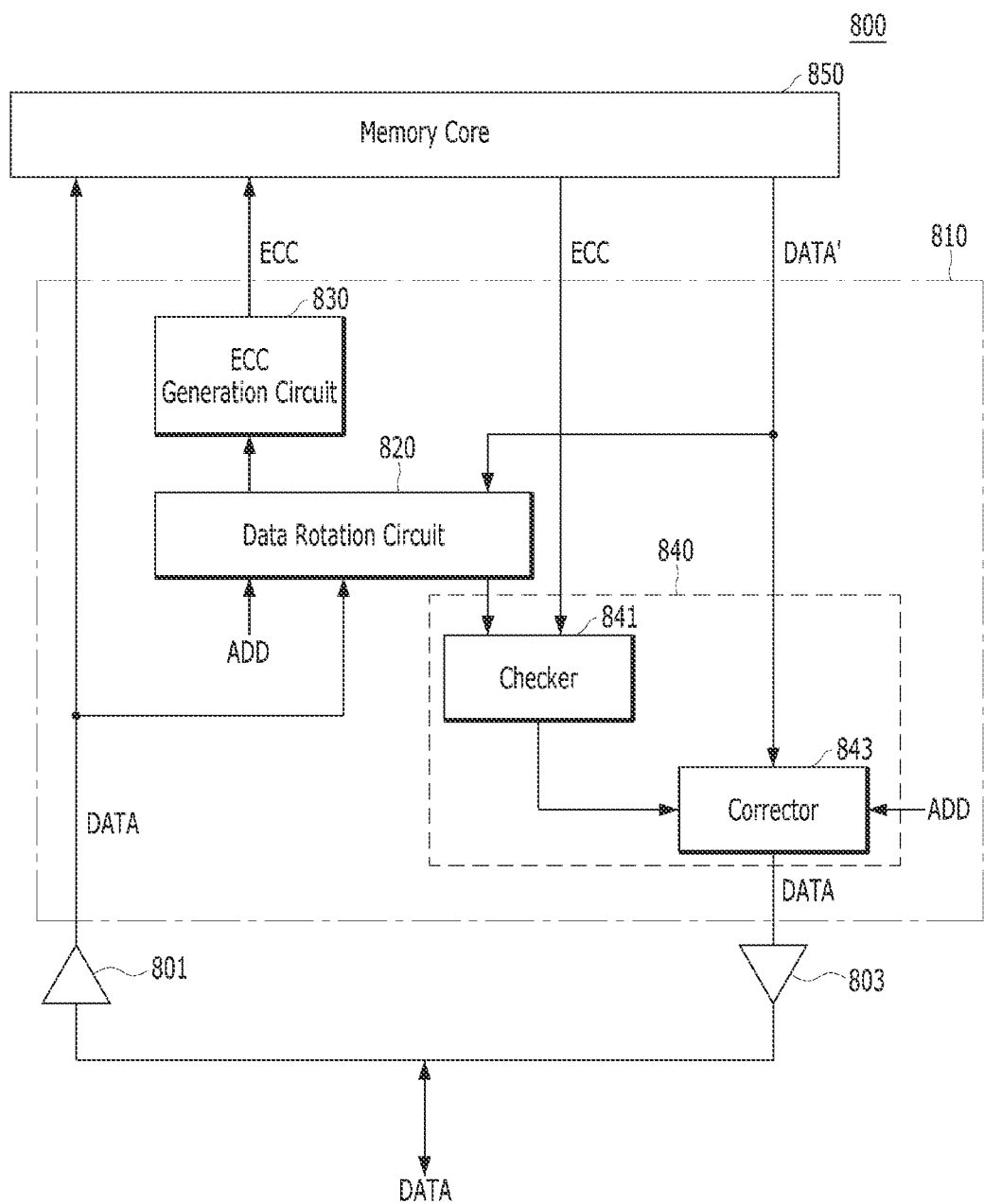
FIG. 8 is a block diagram illustrating a memory in accordance with an embodiment of the present invention.

During a write operation, the data DATA' and the error correction code ECC may be stored in a memory core (such as memory core 850 shown in FIG. 8). Also, during a read operation, data DATA' and the error correction code ECC may be read from the memory core and transferred to the error correction circuit 120.

During a read operation, the error correction circuit 120 may correct an error of the data DATA' based on the error correction code ECC. Here, correcting an error may mean detecting an error of the data DATA' based on the error correction code ECC and, when an error is detected, correcting the detected error. The error correction circuit 120 may include a checker 121 and a corrector 123. The checker 121 may detect whether there is an error or not and the location of the error through an operation based on the data DATA' and the error correction code ECC. The corrector 123 may correct the error detected by the checker 121. The data DATA having an error is corrected by the error correction circuit 120 may be output to the outside of the memory. In other words, the data DATA may be transferred to the memory controller. The error correction circuit 120 may be able to correct not only the data DATA' but also an error occurring in the error correction code ECC.

The error correction code generation circuit 110 and the error correction circuit 120 may generate an error correction code ECC by using a check matrix, which is also called an H matrix, and correct an error based on the error correction code ECC, which will be described below.

FIG. 2 shows an example of a check matrix used by the error correction code generation circuit 110 and the error correction circuit 120. Herein, by way of example and without any limitation, it is assumed that the data includes 8 bits D0 to D7 and the error correction code ECC includes 4 bits E0 to E3.

The check matrix may be a matrix of (number of bits of error correction code)×(number of bits of error correction code+number of bits of data). Herein, since the error correction code includes 4 bits and the data includes 8 bits, the check matrix may be a 4×12 matrix. Each component of the check matrix may have a value of 1 or 0.

The column vectors of the check matrix may respectively correspond to the bits D0 to D7 of the data DATA and the bits E0 to E3 of the error correction code ECC. For example, of the 12 column vectors, 8 column vectors may correspond to the bits D0 to D7 of the data DATA, and 4 column vectors may correspond to the bits E0 to E3 of the error correction code ECC, respectively. In FIG. 2, it may be seen that D1 corresponds to a column vector having a value of '1101', and E2 corresponds to a column vector having a value of '0010'.

FIG. 3 shows how the error correction code generation circuit 110 uses a check matrix.

The error correction code generation circuit 110 may generate the error correction code ECC by multiplying the column vectors of the check matrix by the corresponding bits and then making the sum of each row become 0, which is an even number.

In one embodiment the error correction code ECC may be generated such that all the following four equations may be satisfied.

$$1*D0+1*D1+1*D2+0*D3+1*D4+1*D5+1*D6+1*D7+1*E0+0*E1+0*E2+0*E3=0 \quad \text{[Equation 1]}$$

$$1*D0+1*D1+0*D2+1*D3+1*D4+0*D5+0*D6+1*D7+0*E0+1*E1+0*E2+0*E3=0 \quad \text{[Equation 2]}$$

$$1*D0+0*D1+1*D2+1*D3+0*D4+1*D5+0*D6+1*D7+0*E0+0*E1+1*E2+0*E3=0 \quad \text{[Equation 3]}$$

$$0*D0+1*D1+1*D2+1*D3+0*D4+0*D5+1*D6+1*D7+0*E0+0*E1+0*E2+1*E3=0 \quad \text{[Equation 4]}$$

FIG. 4 shows a result of the error correction code generation circuit 110 generating an error correction code ECC (0,1,1,0) for a data DATA (1,1,0,0,1,0,1,0) by using the check matrix of FIG. 2.

Substituting the data DATA (1,1,0,0,1,0,1,0) and the error correction code ECC (0,1,1,0) into the above four equations, it may be seen that the four equations are satisfied.

$$1*1+1*1+1*0+0*0+1*1+0*1*1+1*0+1*0+0*1+0*1+0*0=0$$

$$1*1+1*1+0*0+1*0+1*0+1*1+0*0+0*1+1*0+0*0+1*1+0*1+0*0=0$$

$$1*1+0*1+1*0+1*0+0*0+1*1+0*0+1*0+1*0+0*0+1*1+0*1+0*0=0$$

$$0*1+1*1+1*1+0*0+1*0+0*0+1*0+0*1+1*1+1*0+0*0+0*1+0*1+1*0=0$$

Equations 1 to 4 may also be used in a process in which the error correction circuit 120 corrects errors of the data DATA and the error correction code ECC based on the error correction code ECC. When the result values of calculating the above four equations are that Equation 1=0; Equation 2=0; Equation 3=0; and Equation 4=0, it may indicate that there is no error. Otherwise, it may indicate that there is an error.

FIG. 5 shows a process of the error correction circuit 120 correcting an error based on the error correction code ECC.

Herein, it is assumed that an error occurs in which the value of D6 is changed from 1 to 0 (1→0) among the data DATA' (1,1,0,0,1,0,1,0), so the data DATA' is (1,1,0,0,1,0,0,0).

Calculating Equations 1 to 4 by substituting the erroneous data DATA' (1,1,0,0,1,0,0,0) and the error correction code ECC (0,1,1,0) into the check matrix may give the following result.

$$1*1+1*1+1*0+0*0+1*1+1*0+1*0+1*0+1*0+0*1+0*0+0*0=1$$

$$1*1+1*1+0*0+1*0+1*0+1*0+0*1+1*0+0*0+0*0+1*1+0*1+0*0=0$$

1*1+0*1+1*0+1*0+0*1+1*0+0*0+1*0+0*0+0*1+
   1*1+0*0=0

0*1+1*1+1*0+1*0+0*1+0*0+1*0+1*0+0*0+0*1+
   0*1+1*0=1

The result (1,0,0,1) may represent the location of the error. Since the column vector having a value of (1,0,0,1) among the column vectors of the check matrix is a column vector corresponding to D6, the error correction circuit 120 may determine that there is an error in D6 and correct the error by inverting the value of D6 from 0 to 1 (0→1). In other words, errors may be corrected correctly.

Obtaining the result of (1,0,0,1) by substituting the data DATA' and the error correction code ECC into the check matrix may be performed by the checker 121, and correcting the error of the location corresponding to (1,0,0,1) may be performed by the corrector 123.

FIG. 6 shows another process of the error correction circuit 120 correcting an error based on the error correction code ECC.

Herein, it is assumed that errors occur in D0 and D3 among the data DATA' (1,1,0,0,1,0,1,0), so the data DATA' is (0,1,0,1,1,0,1,0).

Calculating Equations 1 to 4 by substituting the erroneous data DATA' (0,1,0,1,1,0,1,0) and the error correction code ECC (0,1,1,0) into the check matrix may give the following result.

1*0+1*1+1*0+0*1+1*1+1*0+1*1+1*0+1*0+0*1+
   0*1+0*0=1

1*0+1*1+0*0+1*1+1*1+1*0+0*0+1*1+1*0+0*0+1*1+
   0*1+0*0=0

1*0+0*1+1*0+1*1+1*0+1*1+0*0+1*1+1*0+0*0+0*1+
   1*1+0*0=0

0*0+1*1+1*0+1*1+0*1+1*0+0*0+1*1+1*0+0*0+0*1+
   0*1+1*0=1

The result (1,0,0,1) may represent the location of the error. Since the column vector having a value of (1,0,0,1) among the column vectors of the check matrix is a column vector corresponding to D6, the error correction circuit 120 may determine that there is an error in D6 and correct the error by inverting the value of D6 from 1 to 0 (1→0). As a result of the error correction, the data DATA may become (0,1,0,1,1,0,0,0). As shown, when there is an error of 2 bits D0 and D3 in the data DATA', the error correction circuit 120 may not correct the error. Rather, the error correction circuit 120 may miscorrect the D6, which is a column vector that is not erroneous, thus increasing the error of the data DATA to 3 bits. In this case, the error correction circuit 120 does not reduce the error of the memory, but rather increases the error.

FIG. 7 shows yet another process of the error correction circuit 120 correcting an error based on the error correction code ECC.

Herein, it is assumed that error occur in D6 and D7 among the data DATA' (1,1,0,0,1,0,1,0), so the data DATA becomes (1,1,0,0,1,0,0,1).

Calculating Equations 1 to 4 by substituting the erroneous data DATA' (1,1,0,0,1,0,0,1) and the error correction code ECC (0,1,1,0) into the check matrix may give the following result.

1*1+1*1+1*0+0*0+1*1+1*0+0*1+0*1*1+0*0*1+
   0*1+0*0=0

1*1+1*1+0*0+0*1+1*0+1*1+0*0+0*0+1*1+1*0+0*1+1*1+
   0*1+0*0=1

1*1+0*1+1*0+1*0+1*1+1*0+0*1+1*0+0*0+1*1+0*0+0*1+
   1*1+0*0=1

0*1+1*1+1*0+1*0+0*1+0*0+1*0+0*1+0*1+1*0+0*0+1*1+
   0*1+1*0=0

The result (0,1,1,0) may indicate the location of the error. However, since there is no column vector having a value of (0,1,1,0) among the column vectors of the check matrix, no error may be corrected.

In this example, although there is an error in two bits in the data DATA', no miscorrection is made. Thus, the data DATA may continue to maintain the error of two bits. In short, although the error is not reduced by the error correction operation, the error may not be at least increased.

Although the error of two bits that cannot be corrected by the error correction circuit 120 have occurred in both of the error correction processes of FIGS. 6 and 7, in the case of FIG. 6, the error is increased to three bits due to the miscorrection. In the case of FIG. 7, at least miscorrection has not occurred, so the error may be maintained at two bits. In one embodiment, it is important not to increase the errors of a memory because the memory controller that receives and uses the data of the memory also has an error correction function. For example, when the error of two bits occurs in the memory, the memory controller may correct it, but when the error increases from two bits to three bits due to miscorrection of the memory, the memory controller may not be able to correct it.

Referring to FIGS. 6 and 7, when there is a 2-bit error, the error correction circuit 120 may correct the error of the location indicated by the sum of the column vectors at the locations of the error in the check matrix, which may show a miscorrection operation. For example of FIG. 6, a miscorrection may occur at a location D6 indicated by $$\begin{bmatrix} 1 \\ 0 \\ 0 \\ 1 \end{bmatrix},$$

which is the sum of the column vectors $$\begin{bmatrix} 1 \\ 1 \\ 1 \\ 0 \end{bmatrix} \text{ and } \begin{bmatrix} 0 \\ 1 \\ 1 \\ 1 \end{bmatrix}$$

of the erroneous locations D0 and D3. For another example of FIG. 7, the error of the location indicated by $$\begin{bmatrix} 0 \\ 1 \\ 1 \\ 0 \end{bmatrix},$$

which is the sum of the column vectors $$\begin{bmatrix} 1 \\ 0 \\ 0 \\ 1 \end{bmatrix} \text{ and } \begin{bmatrix} 1 \\ 1 \\ 1 \\ 1 \end{bmatrix},$$

of the erroneous locations D6 and D7 should be corrected, but since the location of the column vector $$\begin{bmatrix} 0 \\ 1 \\ 1 \\ 0 \end{bmatrix}$$

does not exist, miscorrection may not occur.

FIG. 8 is a block diagram illustrating a memory 800 in accordance with an embodiment of the present invention.

Referring to FIG. 8, the memory 800 may include a data receiving circuit 801, a data transferring circuit 803, an ECC block 810, and a memory core 850. Herein, by way of example and without any limitation, it is assumed that the number of bits of data DATA transferred and received at one time is 32 bits. Also, it is assumed that the number of bits of the error correction code ECC used in the memory 800 is 6 bits.

The data receiving circuit 801 may receive data DATA during a write operation. Also, the data transferring circuit 803 may transfer data DATA during a read operation.

The memory core 850 may include a cell array including a plurality of memory cells, and circuits for writing and reading data to and from the cell array.

Figure 9:
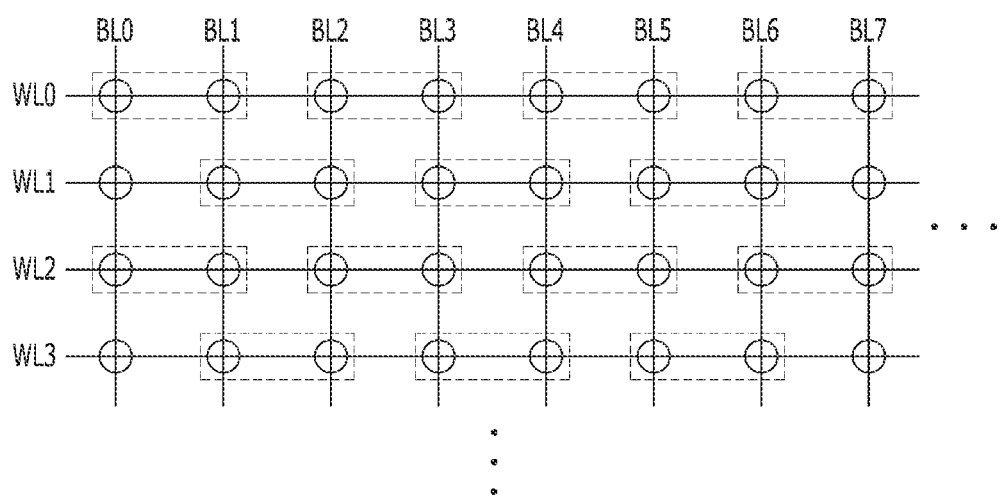
FIG. 9 illustrates a portion of a cell array of a memory core 850.

FIG. 9 illustrates a portion of the cell array of the memory core 850. Referring to FIG. 9, the cell array may include a plurality of word lines (e.g., 4 word lines WL0 to WL3), a plurality of bit lines (e.g., 8 bit lines BL0 to BL7), and memory cells (indicated by circles) located at intersections of the word lines and bit lines. The dotted line in FIG. 9 is a group of memory cells in which a storage node bridge is likely to occur. Referring to FIG. 9, in even-numbered word lines WL0 and WL2, a storage node bridge may occur between the memory cells of BL0 and BL1, between the memory cells of BL2 and BL3, between the memory cells of BL4 and BL5, and between the memory cells of BL6 and BL7. On the other hand, in the odd-numbered word lines WL1 and WL3, a storage node bridge may occur between the memory cells of BL1 and BL2, between the memory cells of BL3 and BL4, and between the memory cells of BL5 and BL6. When a storage node bridge occurs, an error may occur in two neighboring memory cells. In other words, an error may occur in the consecutive 2 bits of the data.

Referring back to FIG. 8, the ECC block 810 may generate an error correction code ECC based on data DATA during a write operation. During a read operation, the ECC block 810 may correct the error of data DATA' based on the error correction code ECC. The ECC block 810 may use a check matrix for generating an error correction code and correcting an error. The check matrix used by the ECC block 810 may be changed according to an address ADD.

The ECC block 810 may include a data rotation circuit 820, an error correction code generation circuit 830, and an error correction circuit 840.

The data rotation circuit 820 may change the order of data and output the data in response to the address ADD. During a write operation, the data rotation circuit 820 may change the order of the data DATA transferred from the data receiving circuit 801 in response to the address ADD and output it. During a read operation, the data rotation circuit 820 may change the order of data DATA' read from the memory core 850 in response to the address ADD and output it. The address ADD may be some bits of a row address. For example, the address ADD may be a lowest-level bit of the row address. Using the address ADD, it is possible to detect which word line among the even-numbered word lines and the odd-numbered word lines in the memory core 850 is accessed. When one of set word lines (e.g., the even-numbered word lines) is accessed, the data rotation circuit 820 may output the data DATA or DATA' as it is without changing the order of the data DATA or DATA'. When one of set word lines (e.g., the odd-numbered word lines) is accessed, the data rotation circuit 820 may change the order of the data DATA or DATA'. Herein, changing the order of the data DATA or DATA' may mean shifting the data DATA or DATA' by a set number of bits (e.g., 1 bit). For example, the order of 32-bit data may be changed from D0, D1, D2, D3 . . . , D30, D31 to D31, D0, D1 . . . , D29, D30.

The error correction code generation circuit 830 may generate an error correction code ECC based on the data transferred from the data rotation circuit 820 during a write operation. The error correction code generation circuit 830 may use a check matrix, e.g., the check matrix as shown in FIG. 10. When the data rotation circuit 820 transfers the data DATA to the error correction code generation circuit 830 without changing the order of the data DATA, the check matrix of FIG. 10 may be used as it is. However, when the data rotation circuit 820 changes the order of the data DATA and transfers the data of the changed order to the error correction code generation circuit 830, the data DATA may be applied to the check matrix of FIG. as shown in FIG. 11. Adjusting FIG. 11 may produce the check matrix of FIG. 12. In one embodiment, when the data rotation circuit 820 does not change the order of the data DATA, that is, when a set word line (e.g., an even-numbered word line) is accessed, the error correction code generation circuit 830 may generate the error correction code ECC based on the check matrix of FIG. 10. When the data rotation circuit 820 changes the order of the data DATA, that is, when a set word line (e.g., an odd-numbered word line) is accessed, the error correction code generation circuit 830 may generate the error correction code ECC based on the check matrix of FIG. 12.

Referring back to FIG. 8, the error correction circuit 840 may correct an error of the data DATA' by using the data transferred from the data rotation circuit 820 and the error correction code ECC read from the memory core 850 during a read operation. Similar to the error correction code generation circuit 830, when a set word line (e.g., an even-numbered word line) is accessed, the error correction circuit 840 may correct an error of the data DATA' by using the check matrix of FIG. 10. When a set word line (e.g., an odd-numbered word line) is accessed, the error correction circuit 840 may correct an error of the data DATA' by using the check matrix of FIG. 12. The error correction circuit 840 may include a checker 841 and a corrector 843.

The checker 841 may detect whether there is an error or not and the location of an error through an operation using the data transferred from the data rotation circuit 820 and the error correction code ECC. Since the checker 841 receives the data from the data rotation circuit 820 and performs an operation on the data, when the data rotation circuit 820 does not change the order of the data, that is, when a set word line (e.g., an even-numbered word line) is accessed, the checker 841 may detect whether there is an error or not and the location of an error by using the check matrix of FIG. 10. Also, when the data rotation circuit 820 changes the order of the data, that is, when a set word line (e.g., an odd-numbered word line) is accessed, the checker 841 may detect whether there is an error or not and the location of an error by using the check matrix of FIG. 12.

The corrector 843 may correct an error which is detected by the checker 841. In response to the address ADD, the corrector 843 may correct an error of the data DATA' by using one between the check matrix of FIG. 10 and the check matrix of FIG. 12. With the address ADD, it may be possible to detect which word line is accessed between the even-numbered word lines and the odd-numbered word lines in the memory core 850. The corrector 843 may use the check matrix of FIG. 10 when the even-numbered word lines are accessed. The corrector 843 may use the check matrix of FIG. 12 when the odd-numbered word lines are accessed. For example, when the operation result of the checker 841 is $$\begin{bmatrix} 1 \\ 0 \\ 0 \\ 1 \\ 0 \\ 0 \end{bmatrix}$$

and the even-numbered word lines are accessed, the corrector 843 may correct the bit D5 corresponding to $$\begin{bmatrix} 1 \\ 0 \\ 0 \\ 1 \\ 0 \\ 0 \end{bmatrix}$$

in the check matrix of FIG. 10. Also, when the odd-numbered word lines are accessed, the corrector 843 may correct the bit D4 corresponding to $$\begin{bmatrix} 1 \\ 0 \\ 0 \\ 1 \\ 0 \\ 0 \end{bmatrix}$$

in the check matrix of FIG. 12.

In one embodiment, the ECC block 810 may generate an error correction code ECC and correct an error by using one between the two check matrices according to the address ADD.

Hereafter, the reason why the ECC block 810 uses one between the check matrix of FIG. 10 and the check matrix of FIG. 12 according to the address ADD will be described.

Referring to FIG. 10, there are check matrices for preventing miscorrection from occurring when errors of cases (1) to (16) are detected, including a case (1) where an error occurs in bits D0 and D1 at the same time, a case (2) where an error occurs in bits D2 and D3 at the same time, a case (3) where an error occurs in bits D4 and D5 at the same time . . . , and a case (16) where an error occurs in bits D30 and D31 at the same time. When an error occurs in bits D0 and D1 at the same time, an error of a location indicated by a column vector $$\begin{bmatrix} 1 \\ 1 \\ 1 \\ 1 \\ 0 \\ 0 \end{bmatrix},$$

which is the sum of the column vector $$\begin{bmatrix} 1 \\ 0 \\ 1 \\ 0 \\ 0 \\ 0 \end{bmatrix}$$

corresponding to the bit D0 and the column vector $$\begin{bmatrix} 0 \\ 1 \\ 0 \\ 1 \\ 0 \\ 0 \end{bmatrix}$$

corresponding to the bit D1 should be corrected in the check matrix of FIG. 10. However, since the column vector $$\begin{bmatrix} 1 \\ 1 \\ 1 \\ 1 \\ 0 \\ 0 \end{bmatrix}$$

does not exist in the check matrix of FIG. 10, miscorrection may not occur. Likewise, when an error occurs in bits D14 and D15 at the same time, the error of a location indicated by a column vector $$\begin{bmatrix} 1 \\ 1 \\ 1 \\ 1 \\ 1 \\ 1 \end{bmatrix},$$

which is the sum of a column vector $$\begin{bmatrix} 1 \\ 0 \\ 1 \\ 0 \\ 1 \\ 0 \end{bmatrix}$$

corresponding to the bit D14 and a column vector $$\begin{bmatrix} 0 \\ 1 \\ 0 \\ 1 \\ 0 \\ 1 \end{bmatrix}$$

corresponding to the bit D15 should be corrected in the check matrix of FIG. 10. Since the column vector $$\begin{bmatrix} 1 \\ 1 \\ 1 \\ 1 \\ 1 \\ 1 \end{bmatrix}$$

does not exist in the check matrix of FIG. 10, miscorrection may not occur.

However, the check matrix of FIG. 10 does not guarantee that miscorrection does not occur even in the cases where an error of 2 bits occurs other than the combinations of (1) to (16). For example, when an error occurs at the same time in bits D5 and D6, the error of a location indicated by a column vector $$\begin{bmatrix} 0 \\ 0 \\ 0 \\ 1 \\ 1 \\ 0 \end{bmatrix},$$

which is the sum of a column vector $$\begin{bmatrix} 1 \\ 0 \\ 0 \\ 1 \\ 0 \\ 0 \end{bmatrix}$$

corresponding to the bit D5 and a column vector $$\begin{bmatrix} 1 \\ 0 \\ 0 \\ 0 \\ 1 \\ 0 \end{bmatrix}$$

corresponding to the bit D6 should be corrected in the check matrix of FIG. 10. In the check matrix of FIG. 10, since the color vector $$\begin{bmatrix} 0 \\ 0 \\ 0 \\ 1 \\ 1 \\ 0 \end{bmatrix}$$

corresponds to the bit D20, miscorrection in which the bit D20 is corrected may occur. If such miscorrection is to be prevented even when an error of two bits occurs other than the combinations of the cases (1) to (16), the number of bits of the error correction code ECC should be increased and a larger size of a check matrix should be used. To this end, the storage capacity of the memory core 850 needs to be increased and the size of the ECC block 810 needs to be increased. It may not be easy to increase the number of bits of the error correction code ECC.

As described above, when an even-numbered word line is accessed in the memory core 850, the possibility that a 2-bit error such as the combinations of the cases (1) to (16) occurs may be increased due to a storage node bridge. However, in this case, the ECC block 810 may generate the error correction code ECC and perform an error correction operation by using the check matrix of FIG. 10. In one embodiment, even though a 2-bit error of the combinations of the cases (1) to (16) occurs, miscorrection may be prevented from occurring.

Referring to the check matrix of FIG. 12, check matrices may be formed such that no miscorrection occur when such errors as the cases of (A) to (O) occur, including a case (A) where an error occurs in bits D1 and D2 at the same time, a case (B) where an error occurs in bits D3 and D4 at the same time, a case (C) where an error occurs in bits D5 and D6 at the same time . . . , and a case (O) where an error occurs in bits D29 and D30 at the same time.

When an error occurs in bits D1 and D2 at the same time, an error of a location indicated by a column vector which is the sum of the column vector $$\begin{bmatrix} 1 \\ 0 \\ 1 \\ 1 \\ 0 \\ 0 \end{bmatrix},$$

which is the sum of the column vector $$\begin{bmatrix} 0 \\ 1 \\ 1 \\ 0 \\ 0 \\ 0 \end{bmatrix}$$

corresponding to the bit D1 and the column vector $$\begin{bmatrix} 1 \\ 1 \\ 0 \\ 1 \\ 0 \\ 0 \end{bmatrix}$$

corresponding to the bit D2 should be corrected in the check matrix of FIG. 12. However, since the column vector $$\begin{bmatrix} 1 \\ 0 \\ 1 \\ 1 \\ 0 \\ 0 \end{bmatrix}$$

does not exist in the check matrix of FIG. 12, miscorrection may not occur.

However, the check matrix of FIG. 12 does not guarantee that miscorrection does not occur even in the cases where an error of 2 bits occurs other than the combinations of (A) to (O). For example, when an error occurs in bits D20 and D21 at the same time, the error of a location indicated by a column vector $$\begin{bmatrix} 1 \\ 0 \\ 1 \\ 0 \\ 1 \\ 0 \end{bmatrix},$$

which is the sum of a column vector $$\begin{bmatrix} 0 \\ 0 \\ 1 \\ 1 \\ 0 \\ 1 \end{bmatrix}$$

corresponding to the bit D20 and a column vector $$\begin{bmatrix} 1 \\ 0 \\ 0 \\ 1 \\ 1 \\ 0 \end{bmatrix}$$

corresponding to the bit D21 should be corrected in the check matrix of FIG. 12. In the check matrix of FIG. 12, since the column vector $$\begin{bmatrix} 1 \\ 0 \\ 1 \\ 0 \\ 1 \\ 0 \end{bmatrix}$$

corresponds to the bit D13, miscorrection in which the bit D13 is corrected may occur.

As described above, when an odd-numbered word line is accessed in the memory core 850, the possibility that a 2-bit error such as the combinations of the cases (A) to (O) occurs may be increased due to a storage node bridge. However, in this example, the ECC block 810 may generate the error correction code ECC and perform an error correction operation by using the check matrix of FIG. 12. Therefore, even though a 2-bit error of the combinations of the cases (A) to (O) occurs, miscorrection may be prevented from occurring.

Herein, it is illustrated that the check matrix used in the ECC block 810 is changed depending on whether the word line accessed in the memory core 850 is an odd-numbered word line or an even-numbered word line, but the ECC block 810 may be designed such that the check matrix used in the ECC block 810 is changed based on the bit line accessed in the memory core 850 or based on the regions in the memory core 850.

In the above, a technique for reducing the probability of occurrence of miscorrection by changing the check matrix used by the ECC block 810 according to the address ADD is described.

Furthermore, it may be also possible to actively correct a 2-bit error that occurs frequently.

When an even-numbered word line is accessed in the memory core 850, that is, when the ECC block 810 uses the check matrix of FIG. 10, the possibility that an error of 2 bits such as the combinations of (1) to (16) occurs may be high. Therefore, it is possible to actively correct a 2-bit error by using it. For example, when an error occurs in bits D0 and D1, the calculation result of the checker 841 may be $$\begin{bmatrix} 1 \\ 1 \\ 1 \\ 1 \\ 0 \\ 0 \end{bmatrix}.$$

In this case, the corrector 843 may be designed to correct the error by inverting the bit D0 and the bit D1. Likewise, when an error occurs in bits D2 and D3, the calculation result of the checker 841 may be $$\begin{bmatrix} 1 \\ 0 \\ 1 \\ 1 \\ 0 \\ 0 \end{bmatrix}.$$

In this case, the corrector 843 may be designed to correct the error by inverting the bit D2 and the bit D3. The cases where the corrector 843 corrects a 2-bit error based on the calculation result of the checker 841 are summarized in FIG. 13. Other than correcting a 1-bit error by using the check matrix of FIG. 10, 2-bit errors, which occur frequently, may be corrected by designing the corrector 843 to correct a 2-bit error when the conditions of FIG. 13 are satisfied.

When an odd-numbered word line is accessed in the memory core 850, that is, when the ECC block 810 uses the check matrix of FIG. 12, the possibility that an error of 2 bits such as the combinations of (A) to (0) occurs may be high. In one embodiment, it is possible to actively correct a 2-bit error by using it. For example, when an error occurs in bits D1 and D2, the calculation result of the checker 841 may be $$\begin{bmatrix} 1 \\ 0 \\ 1 \\ 1 \\ 0 \\ 0 \end{bmatrix}.$$

In this case, the corrector 843 may be designed to correct the error by inverting the bit D1 and the bit D2. Likewise, when an error occurs in bits D17 and D18, the calculation result of the checker 841 may be $$\begin{bmatrix} 0 \\ 1 \\ 1 \\ 1 \\ 1 \\ 1 \end{bmatrix}.$$

In this case, the corrector 843 may be designed to correct the error by inverting the bit D17 and the bit D18. The cases where the corrector 843 corrects a 2-bit error based on the calculation result of the checker 841 are summarized in FIG. 14. Other than correcting a 1-bit error by using the check matrix of FIG. 12, 2-bit errors, which occur frequently, may be corrected by designing the corrector 843 to correct a 2-bit error when the conditions of FIG. 14 are satisfied.

According to one embodiment of the present invention, it may be possible to reduce errors in error correction in a memory.

While the present invention has been described with respect to the specific embodiments, it will be apparent to those skilled in the art that various changes and modifications may be made without departing from the spirit and scope of the invention as defined in the following claims.

What is claimed is:

1. A memory comprising:
   a data receiving circuit suitable for receiving data during a write operation;
   a data rotation circuit suitable for changing an order of the data transferred from the data receiving circuit and outputting the data having an order changed in response to an address during the write operation;
   an error correction code generation circuit suitable for generating an error correction code based on the data output from the data rotation circuit during the write operation;
   a memory core suitable for storing a) the data received by the data receiving circuit and b) the error correction code based on the data output from the data rotation circuit during the write operation,
   wherein the data rotation circuit changes the order of the data read from the memory core and outputs the data having the order changed in response to the address during a read operation, and
   the memory further comprises:
   an error correction circuit suitable for correcting an error of the data read from the memory core based on the data output from the data rotation circuit and the error correction code read from the memory core during the read operation.

2. The memory of claim 1, further comprising:
   a data transferring circuit suitable for outputting error-corrected data corrected by the error correction circuit.

3. The memory of claim 1, wherein the address is a portion of bits of a row address.

4. The memory of claim 3, wherein the data rotation circuit shifts the order of the data input to the data rotation circuit according to a level of the portion of the bits of the row address and outputs the shifted data, or outputs the data input to the data rotation circuit without any shift.

5. The memory of claim 3, wherein the error correction circuit is capable of
   a) correcting a 1-bit error occurring in the data read from the memory core, and
   b) correcting errors in some cases and miscorrecting the errors in other cases, among cases when an error of 2 consecutive bits occurs in the data read from the memory core.

6. The memory of claim 3, wherein the error correction circuit is capable of
   a) correcting a 1-bit error occurring in the data read from the memory core, and b) not miscorrecting errors in some cases and miscorrecting the errors in other cases, among cases when an error of 2 consecutive bits occurs in the data read from the memory core.

7. A memory comprising:
a data receiving circuit suitable for receiving write data including a plurality of bits for a write operation;
a data rotation circuit suitable for selectively changing an order of the plurality of bits in the write data based on an address associated with the write data to generate write output data;
an error correction code generation circuit suitable for generating an error correction code based on the write output data;
a memory core suitable for storing the write output data and the error correction code; and
an error correction circuit receives, from the memory core, read data including multiple bits and the error correction code,
wherein the data rotation circuit receives the read data from the memory core and selectively changes the order of the multiple bits in the read data based on an address associated with the read data to generate read output data, and
wherein the error correction circuit corrects an error of the read data based on the read output data and the error correction code.

\* \* \* \* \*